US011167686B2

(12) United States Patent
Dubuc et al.

(10) Patent No.: US 11,167,686 B2
(45) Date of Patent: Nov. 9, 2021

(54) LIGHTNING AND/OR SIGNALING DEVICE FOR AUTOMOBILE AND ASSEMBLY COMPRISING SEVERAL DEVICES

(71) Applicant: VALEO VISION, Bobigny (FR)

(72) Inventors: Cyril Dubuc, Bobigny (FR); Pascal Garin, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/708,836

(22) Filed: Sep. 19, 2017

(65) Prior Publication Data

US 2018/0086251 A1   Mar. 29, 2018

(30) Foreign Application Priority Data

Sep. 26, 2016  (FR) .................................... 16 59052

(51) Int. Cl.
*B60Q 1/068*      (2006.01)
*F21S 45/40*      (2018.01)
(Continued)

(52) U.S. Cl.
CPC .......... *B60Q 1/0683* (2013.01); *F21S 41/141* (2018.01); *F21S 41/39* (2018.01);
(Continued)

(58) Field of Classification Search
CPC ...... B60Q 1/0683; F21S 41/141; F21S 41/39; F21S 45/40
See application file for complete search history.

(56) References Cited

U.S. PATENT DOCUMENTS 3,823,314 A     7/1974 Germany
4,580,202 A *   4/1986 Morette ............... B60Q 1/0683
                                                    362/273
(Continued)

FOREIGN PATENT DOCUMENTS

CN      1241503 A     1/2000
CN    105531150 A     4/2016
(Continued)

OTHER PUBLICATIONS

French Preliminary Search Report dated Jun. 26, 2017 in French Application 16 59052 filed on Sep. 26, 2016 (with English Translation of Categories of Cited Documents).

(Continued)

*Primary Examiner* — Rajarshi Chakraborty
*Assistant Examiner* — Nathaniel J Lee
(74) *Attorney, Agent, or Firm* — Oblon, McClelland, Maier & Neustadt, L.L.P.

(57) ABSTRACT

A device including at least one optical module for emission of a light beam which is mounted on a support arranged on a frame orthogonal to the axis of emission and is mounted in adjustable manner on the frame by means of a sighting mechanism which includes at least two parallel threaded rods carried by the support. Each module extends an associated hole in the frame and carries a spherical nut having an active clamping spherical face which cooperates with a complementary bearing surface formed of the frame. The two threaded rods include one reference threaded rod carrying a nut whose active face cooperates with a complementary spherical reference bearing surface of truncated spherical profile, and at least one adjustment threaded rod which carries a nut whose active face cooperates with a complementary cylindrical adjustment bearing surface of truncated cylindrical profile.

21 Claims, 9 Drawing Sheets

(51) Int. Cl.
*F21S 41/141* (2018.01)
*F21S 41/39* (2018.01)
*F21Y 115/10* (2016.01)

(52) U.S. Cl.
CPC .......... *F21S 45/40* (2018.01); *B60Q 2200/32* (2013.01); *F21Y 2115/10* (2016.08)

(56) References Cited

U.S. PATENT DOCUMENTS

| | | | | |
|---|---|---|---|---|
| 5,003,436 | A * | 3/1991 | Yamada | B60Q 1/0683 362/420 |
| 5,260,857 | A * | 11/1993 | Lukkarinen | F21S 41/675 362/528 |
| 5,360,282 | A * | 11/1994 | Nagengast | B60Q 1/0683 403/119 |
| 5,908,239 | A | 6/1999 | Sugimoto | |
| 7,931,395 | B2 * | 4/2011 | Kim | B60Q 1/0683 362/523 |
| 2002/0085386 | A1 | 7/2002 | Shirai | |
| 2009/0154190 | A1 * | 6/2009 | Choi | B60Q 1/0683 362/549 |
| 2014/0286692 | A1 * | 9/2014 | Kondo | F16C 11/0657 403/81 |
| 2016/0167564 | A1 | 6/2016 | Letoumelin et al. | |
| 2016/0201869 | A1 | 7/2016 | Shibata et al. | |

FOREIGN PATENT DOCUMENTS

| | | |
|---|---|---|
| FR | 2 188 527 | 1/1974 |
| FR | 2 819 041 A1 | 7/2002 |
| FR | 3 010 690 A1 | 3/2015 |

OTHER PUBLICATIONS

Office Action dated Dec. 1, 2020 in Chinese Application No. 201710927296.5, along with an English translation.

* cited by examiner

LIGHTNING AND/OR SIGNALING DEVICE FOR AUTOMOBILE AND ASSEMBLY COMPRISING SEVERAL DEVICES

TECHNICAL FIELD OF THE INVENTION

The invention concerns a lighting and/or signaling device, especially for an automobile.

Such a device may take the form in particular of a headlight of an automobile, for example to produce an illumination light beam or a low beam.

TECHNICAL BACKGROUND OF THE INVENTION

The invention concerns more particularly a lighting and/or signaling device comprising an optical module for emission of a light beam in the forward direction along a horizontal axis of emission, which is mounted on a support for the various components of the optical module.

The support for each optical module is disposed on a structural element of the lighting device which is a frame element on which each support is mounted in adjustable manner by means of a sighting mechanism enabling the adjustment of the axis of emission of the optical module, and in particular at least one inclination of the axis of emission of the optical module, for example in a horizontal plane and/or in a vertical plane.

The invention in particular intends to propose a design of a sighting mechanism which enables in particular a precise adjustment, reliable over time, of the orientation of the axis of emission in relation to the frame.

The invention also intends to propose an assembly comprising several lighting devices according to the invention, whose associated sighting mechanisms enable a precise adjustment, reliable over time, of the relative orientations of the various axes of emission.

BRIEF SUMMARY OF THE INVENTION

The invention proposes a lighting and/or signaling device, especially for an automobile, comprising at least one optical module for emission of a light beam in the forward direction along a horizontal axis of emission, which is mounted on a support arranged on a frame extending in a transverse plane which is generally orthogonal to the axis of emission, the support being mounted in adjustable manner on the frame by means of a sighting mechanism to enable the adjusting of the axis of emission of the optical module, characterized:

in that the sighting mechanism comprises at least two parallel threaded rods carried by the support, each of which extends longitudinally backward through an associated hole in the frame and carries a spherical nut comprising an active clamping face of truncated spherical profile which cooperates with a complementary bearing surface formed opposite said active clamping face in the rear face of the frame, and in that the at least two threaded rods comprise:

one reference threaded rod carrying a spherical reference nut whose active face cooperates with a complementary spherical reference bearing surface of truncated spherical profile;

and at least one adjustment threaded rod which carries a spherical adjustment nut whose active face cooperates with a complementary cylindrical adjustment bearing surface of truncated cylindrical profile.

According to other characteristics of the invention:

the sighting mechanism comprises a third pivoting threaded rod parallel to the reference and adjustment threaded rods which is carried by the associated support, which extends longitudinally backward through an associated hole in the frame and which carries a spherical pivoting nut comprising an active face of truncated spherical profile which cooperates with a complementary bearing surface of linear pivoting profile formed opposite said active face in the rear face of the frame, constituting with the reference threaded rod means of pivoting guidance of the support in relation to the frame about a pivoting axis passing through the centers of the active surfaces of the spherical reference nut and the spherical pivoting nut;

the complementary bearing surface of linear profile comprises two rectilinear support ribs situated on either side of the spherical pivoting nut;

the line passing through the centers of the active surfaces of the spherical reference nut and the spherical adjustment nut extends in a horizontal plane for adjusting the inclination of the axis of emission of the optical module;

the line passing through the centers of the active surfaces of the spherical reference nut and the spherical adjustment nut extends in a vertical plane for adjusting the inclination of the axis of emission of the optical module;

the pivoting axis is orthogonal to the line passing through the centers of the active surfaces of the spherical reference nut and the spherical adjustment nut;

the segment of each threaded rod extending longitudinally through the associated hole in the frame is received with radial play in said associated hole;

the support comprises a planar fixation wing extending in a plane generally orthogonal to the axis of emission and carrying said threaded rods extending longitudinally backward from a rear face of this fixation wing;

the fixation wing comprises a front face carrying at least one component of the optical module;

the support comprises a board extending to the front from the fixation wing and carrying at least one component of the optical module;

the support is made as a single piece by molding;

the frame is a plate in which said holes are formed and which is bounded by said rear face and by a front face;

the plate extends in a plane generally parallel to the fixation wing;

the frame is made as a single piece by molding;

the optical module comprises:

either the assembly of a collector disposed to collect the light emanating from a light source, a bending element having a cutting edge so as to let pass only a portion of the beam coming from the collector and to thus produce a corresponding light beam and its cutoff, and a reflector disposed to emit said corresponding light beam in the forward direction;

or the assembly of a collector disposed to collect the light emanating from a light source, a bending element having at least one cutting edge so as to let pass only a portion of the beam coming from the collector and to emit the corresponding light beam and its cutoff, and a lens disposed to focus the light beam coming from the collector;

or a reflector having a complex surface configured to collect the light emanating from a light source and to emit in the forward direction the corresponding light beam having a cutoff;

the optical module comprises a cooling device which directly or indirectly is in contact with the support;

the optical module comprises at least one light source in the form of at least one light-emitting diode.

The invention also proposes a lighting and/or signaling assembly, especially for an automobile, comprising at least:

a first device according to the invention for emission of a first light beam in the forward direction along a horizontal axis of emission;

and a second device according to the invention for emission of a second light beam in the forward direction along a horizontal axis of emission, the first support of the first device and the second support of the second device being arranged with respect to each other on a common frame extending in a transverse plane generally orthogonal to the axes of emission, the first support and the second support being mounted in adjustable manner on the common frame by means of a first sighting mechanism and a second sighting mechanism, respectively.

According to other characteristics of the assembly:

the first sighting mechanism comprises means of locking in position the first support with respect to the common frame;

each threaded rod of the first sighting mechanism comprises a shoulder which bears longitudinally against an opposite portion of a front face of the common frame;

the second sighting mechanism comprises means of adjusting the longitudinal position of the second support with respect to the common frame, along a direction parallel to the second axis of emission;

each threaded rod of the second sighting mechanism extends through a spring which is mounted compressed longitudinally between the second support and the common frame;

the assembly comprises a third device according to the invention for emission of a third light beam in the forward direction along a horizontal axis of emission, the third support of the third device being disposed on the common frame, and being mounted in adjustable manner on the common frame by means of a third sighting mechanism whose design is identical to that of the second sighting mechanism;

the first device is disposed transversely between the second and third devices.

BRIEF DESCRIPTION OF THE FIGURES

Other characteristics and advantages of the invention will appear in the course of a perusal of the following detailed description, for the understanding of which one will consult the appended drawings, in which.

DETAILED DESCRIPTION OF THE FIGURES

In the following description, identical, analogous or similar components shall be designated by the same references.

In nonlimiting manner and without reference to the earth's gravity, we shall use the terms vertical, horizontal, transverse, longitudinal in regard to the trihedron L, V, T represented in the figures.

We shall refer to the front-rear orientation along the direction of the longitudinal axis L of the trihedra represented in the figures.

Figure 1:
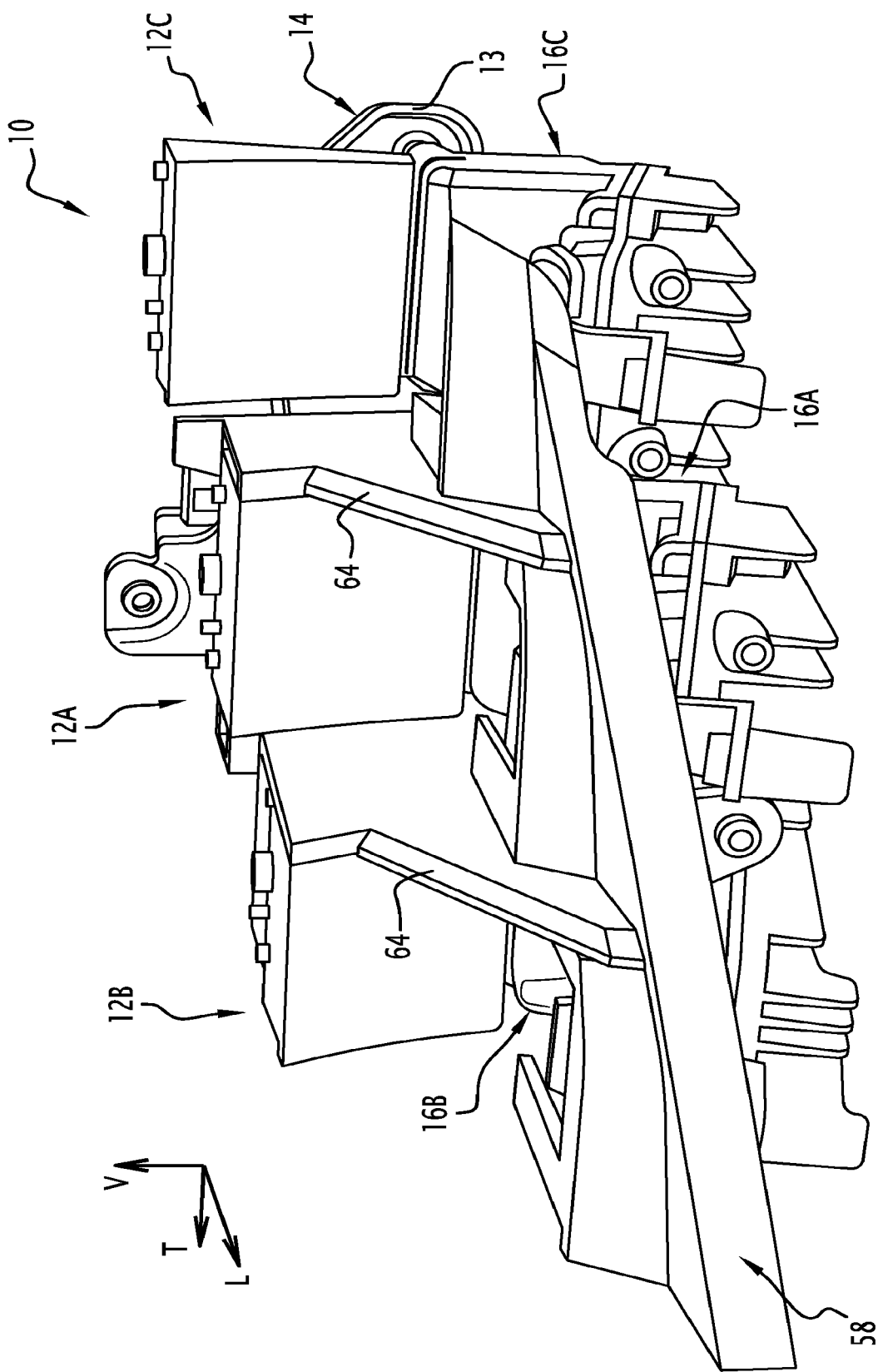
FIG. 1 is a perspective view of an exemplary embodiment of a lighting assembly according to the invention comprising three lighting devices according to the invention, each one comprising an individual associated support arranged on a common frame.
Figure 2:
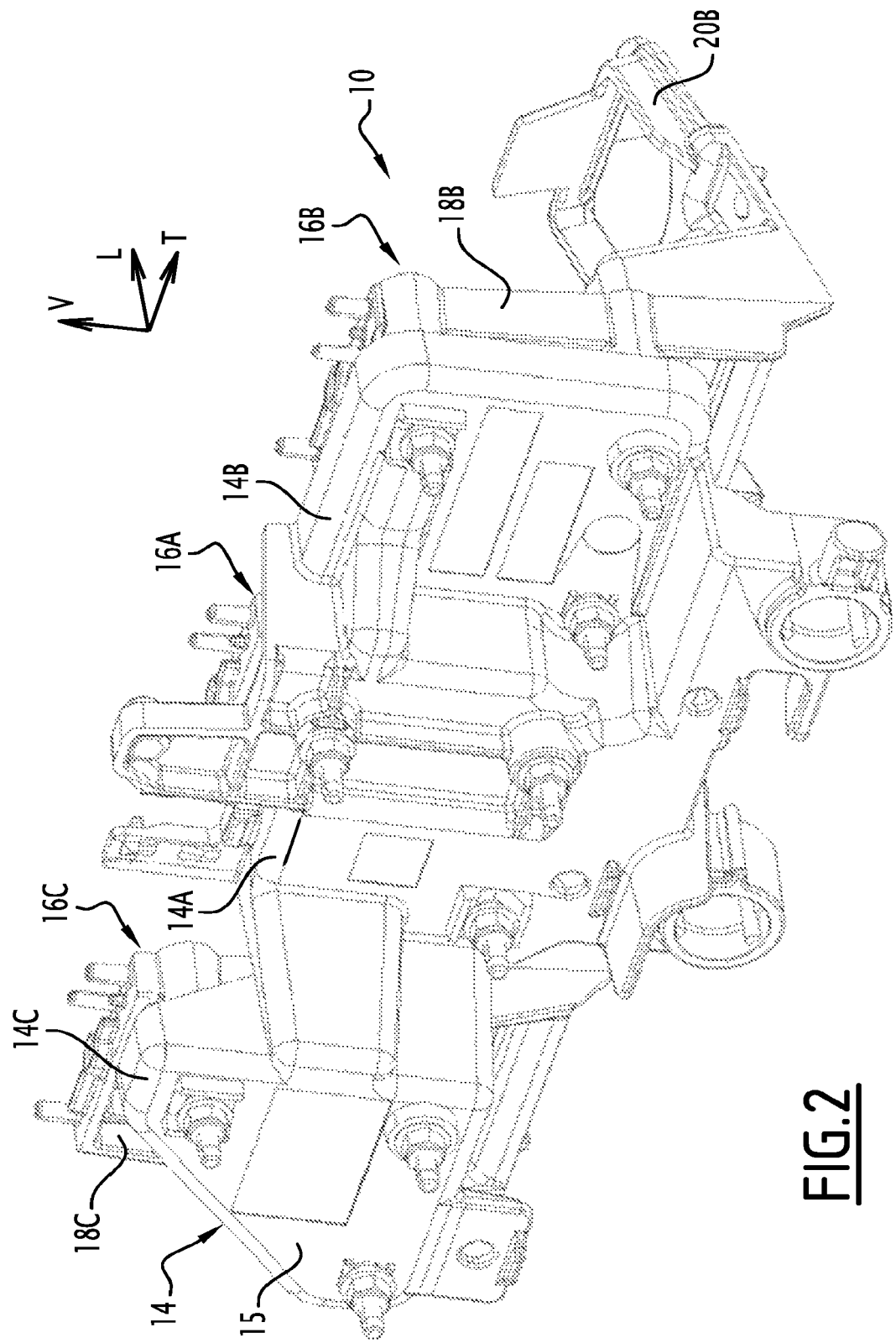
FIG. 2 is a perspective view along a different angle of representation than that of FIG. 1 which, for the same assembly, only illustrates the common frame, the three individual supports and the three sighting mechanisms.
Figure 3:
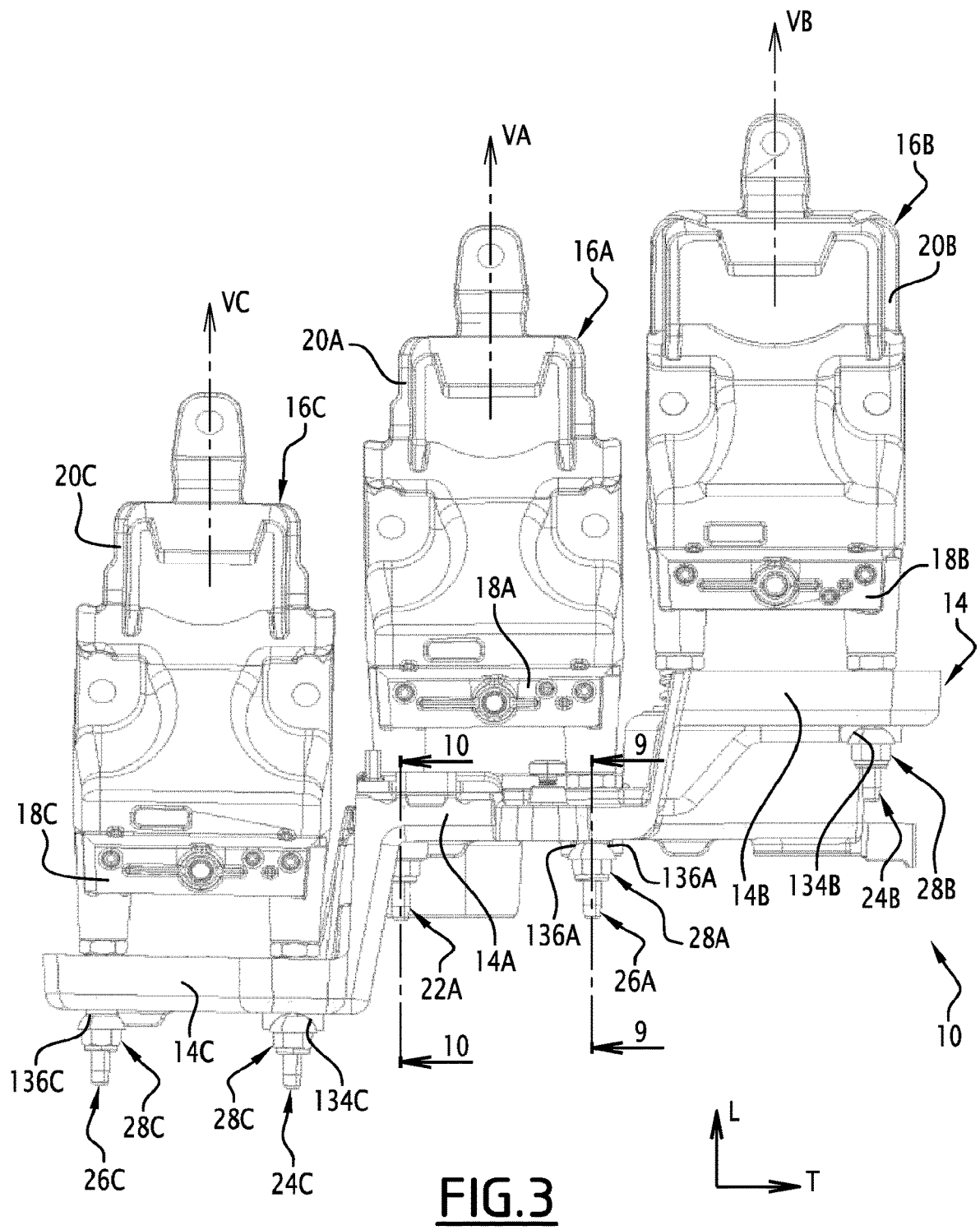
FIG. 3 is a top view of the elements illustrated in FIG. 2.
Figure 4:
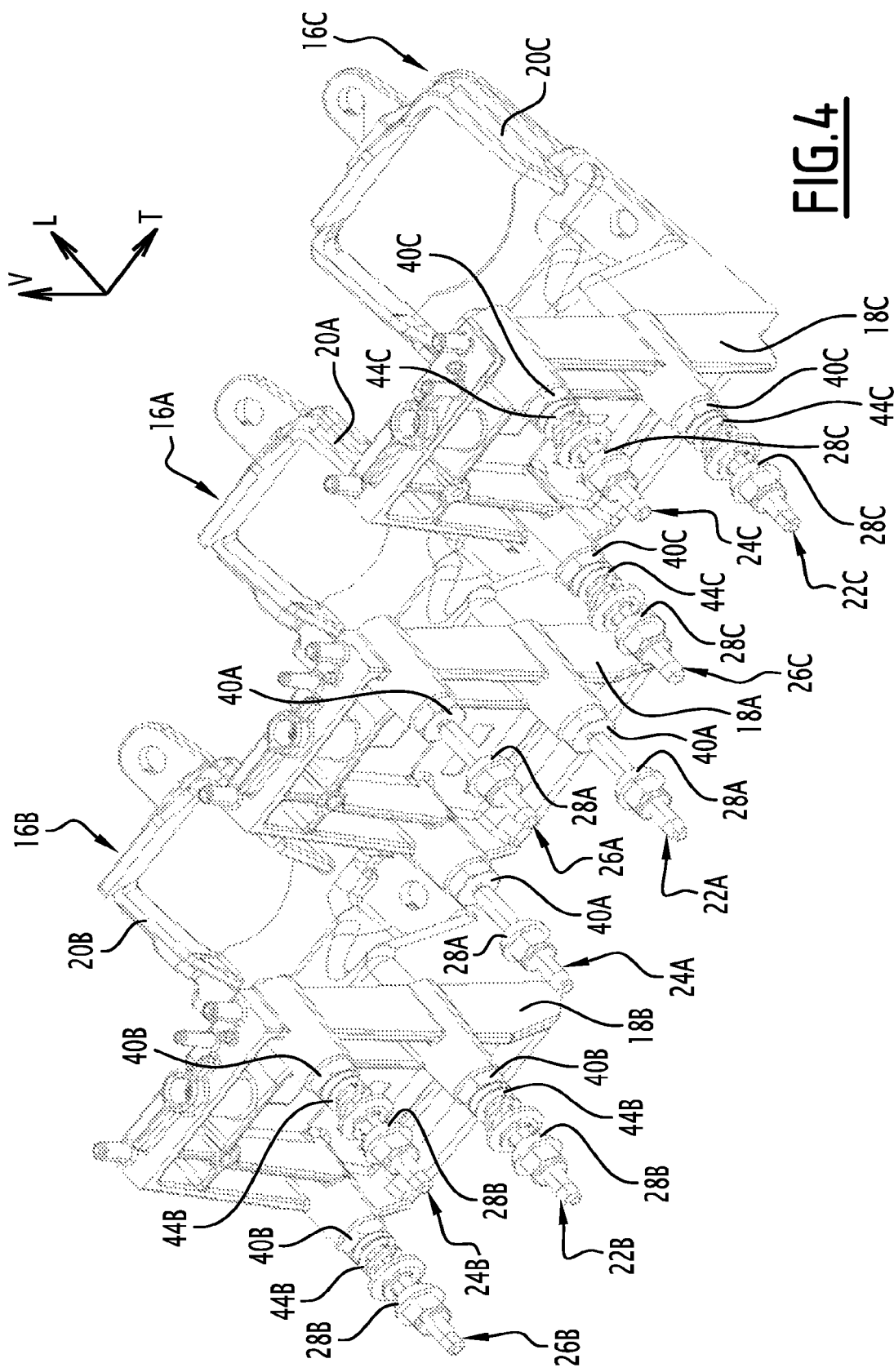
FIG. 4 is a view analogous to that of FIG. 2 without the common frame.
Figure 5:
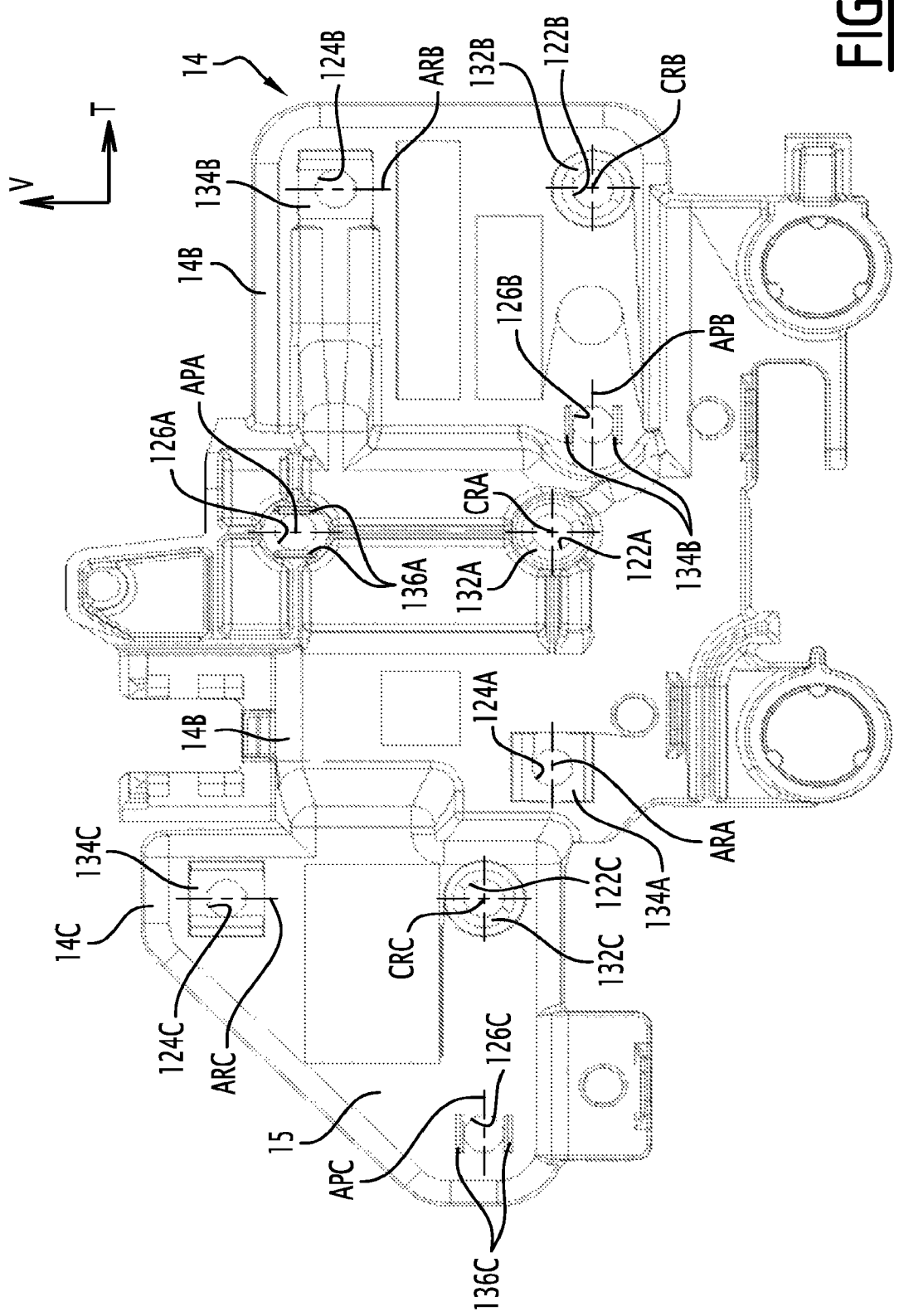
FIG. 5 is a rear elevation view of the common frame.

There is represented in FIG. 1 a lighting assembly 10 having three adjacent optical modules 12A, 12B and 12C which are substantially aligned transversely with a slight vertical offset relative to each other and with a slight longitudinal offset relative to each other.

Each optical emission module 12A, 12B and 12C is of identical general design, which design shall be described in detail below.

Each optical emission module 12A, 12B, and 12C allows the emission of a light beam in the forward direction, along a generally horizontal axis of emission, the three horizontal axes of emission VA, VB, VC being generally parallel, give or take the angular deviations allowed by the sighting mechanisms which will be described below. Nominally, the three axes are not parallel.

The assembly 10 comprises a common frame 14 on which are mounted the three optical modules 12A, 12B, and 12C.

The common frame 14 is a piece made by molding which extends generally in a vertical and transverse plane and which comprises three consecutive and adjacent portions 14B, 14A, 14C longitudinally offset from one another, on each of which there are mounted the three individual supports 16B, 16A, and 16C respectively.

Each individual support 16A, 16B, 16C is a piece made by molding and substantially comprised of a fixation wing 18A, 18B, and 18C in the shape of a plate extending generally in a vertical and transverse plane, that is, substantially parallel to the corresponding facing portion 14A, 14B, 14C of the common frame 14.

Each individual support 16A, 16B, and 16C also comprises a component mounting board 20A, 20B, and 20C which extends generally to the front from the lower portion of the corresponding vertical fixation wing 16A, 16B, and 16C.

To enable its mounting on the common frame 14 and its adjustment, especially angular adjustment with respect to the common frame 14, each individual support 16A, 16B, and 16C is associated with a so-called sighting (or adjustment) mechanism, each of which is here comprised generally of a group of three threaded rods and three spherical nuts.

Thus, each sighting mechanism has three parallel threaded rods, each of which is carried here by the fixation wing 18A, 18B, and 18C of the associated individual support 16A, 16B, and 16C to which they are secured for example by screwing their front segments (see FIGS. 9 and 10), or in a variant by overmolding.

Figure 7:
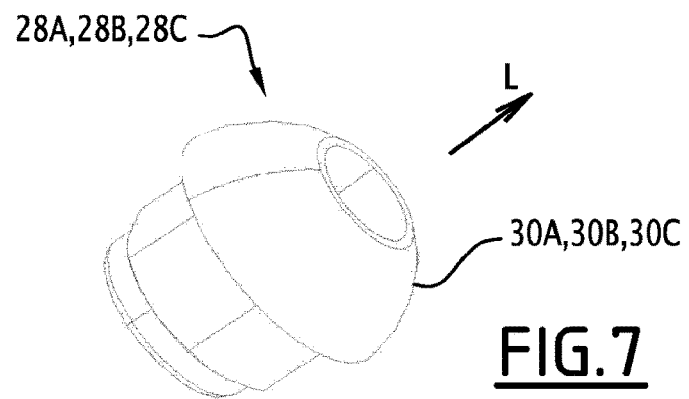
FIG. 7 is a perspective view illustrating a spherical nut belonging to a sighting mechanism.
Figure 8:
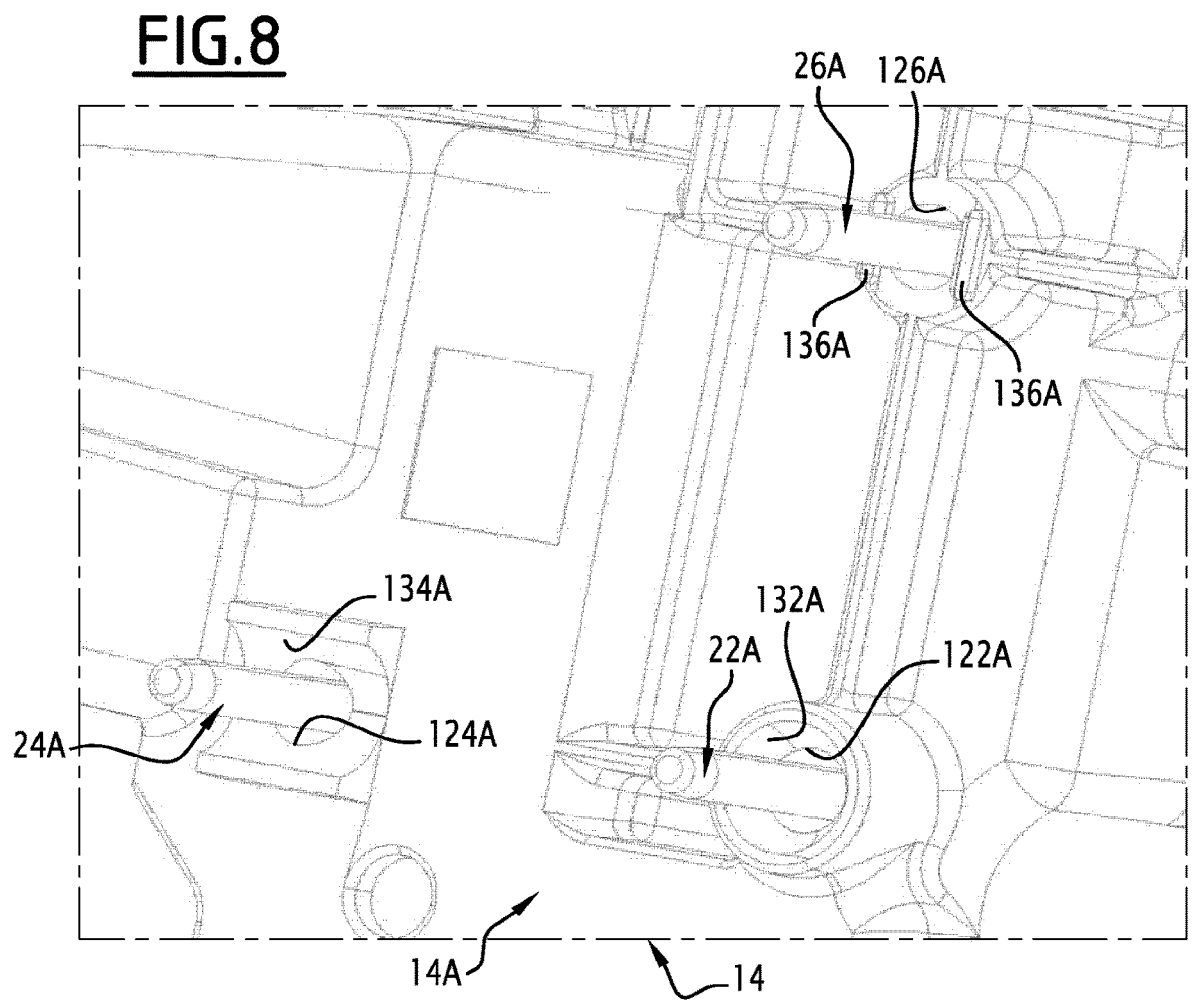
FIG. 8 is a detail view on a large scale of the central portion of the common frame illustrated in FIG. 5.

The three threaded rods extend longitudinally backward and each one carries a so-called spherical clamping nut 28A, 28B, and 28C, respectively, which as can be seen in FIG. 7 contains an active clamping face of truncated spherical profile 30A, 30B and 30C, having a convex profile here.

As a nonlimiting example, all the threaded rods and all the spherical nuts are of identical design here.

Each sighting mechanism has a first threaded rod 22A, 22B, and 22C, known as a reference threaded rod, which carries an associated spherical reference nut, a second threaded rod known as an adjustment threaded rod 24A, 24B, and 24C, which carries an associated spherical adjustment nut, and a third threaded rod, known as a pivoting threaded rod 26A, 26B, and 26C, which carries an associated spherical pivoting nut.

The notion of a reference, adjustment or pivoting threaded rod is defined in relation to the type or mode of cooperation of the associated spherical nut with a corresponding portion of the common frame 14.

Each portion 14A, 14B, and 14C of the common frame 14 has a group of three holes which are disposed here to make up the vertices of a right isosceles triangle.

Each hole is traversed, with radial play, by an intermediate segment of an associated threaded rod.

Each reference threaded rod 22A, 22B, and 22C extends longitudinally backward through a hole 122A, 122B, and 122C; each adjustment rod 24A, 24B, and 24C extends longitudinally backward through a hole 124A, 124B, 124C; and each pivoting threaded rod extends longitudinally backward through an associated hole 126A, 126B and 126C of the common frame 14.

In the rear face 13 of the common frame 14, each hole is bounded by a portion of a planar bearing surface 42A, 42B, 42C which extends in a transverse and vertical plane, the three portions of planar surface—of the same group of three holes extending through a portion 14A, 14B, and 14C respectively—being situated in the same transverse and vertical plane.

In the front face 15 of the frame 14, each hole emerges into an associated bearing surface whose profile is functional and distinct in function from the reference, adjustment, or pivoting threaded rod which passes through it.

The holes 122A, 122B, and 122C associated with the reference threaded rods 22A, 22B and 22C can be seen, each of which emerges into a complementary spherical reference bearing surface 132A, 132B, and 132C of concave truncated spherical profile, each of which is complementary to the profile of the active clamping face 30A, 30B, and 30C of an associated spherical nut 28A, 28B, and 28C.

Each reference threaded rod 22A, 22B, and 22C is thus mounted in rotation with respect to the common frame 14 about a center of rotation CRA, CRB, CRC corresponding to the center of the spherical reference bearing surface.

Each hole 124A, 124B, 124C traversed by an adjustment threaded rod 22A, 24B, and 24C emerges into a complementary cylindrical bearing surface 134A, 134B, and 134C, each of which has a concave truncated cylindrical profile, the axis ARA, ARB, ARC of each cylindrical bearing surface 134A, 134B, and 134C passing through the associated center CRA, CRB, CRC.

The axis ARA of the central adjustment mechanism extends here along the transverse horizontal direction, whereas the axes ARB and ARC of the lateral sighting mechanisms each extend along a vertical direction.

Each pivoting threaded rod 26A, 26B, and 26C extends through an associated hole 126A, 126B, and 126C of the common frame 14 which, in the rear face 15, is surrounded by a complementary bearing surface of linear profile, each of which is constituted here by two rectilinear bearing ribs, 136A, 136B, and 136C, parallel to each other.

The two ribs of each pair are situated on either side of the associated hole 126A, 126B, and 126C and they are formed in relief so as to constitute two parallel bearing ridges.

The two ribs 136A, 136B, 136C of each pair of ribs are parallel to a median pivot axis APA, APB, APC which passes through the associated center of rotation CRA, CRB, CRC.

The pivot axis APA of the central sighting mechanism extends here along the vertical direction and is orthogonal to the axis ARA.

Each of the pivot axes APB and APC of the lateral sighting mechanisms is horizontal and orthogonal to the associated axis ARB, ARC here.

The cooperation of the active face 30 of each nut 28 with a complementary spherical bearing surface 132A, 132B, 132C constitutes a spherical contact of each nut on the common frame 14.

The bearing of the active face of a spherical nut 28 against an associated cylindrical bearing surface 134A, 134B, 134C constitutes a linear contact of each spherical nut on the common frame 14.

The cooperation of the active face 30 of each nut with the pair of rectilinear ribs 136a, 136B, 136C determines a longitudinal and nearly pointlike bearing of the nut against the common frame 14.

Besides its threaded segment which extends through an associated hole of the common frame 14 and enables the screwing on of an associated spherical nut, each threaded rod comprises a shoulder which delimits a rear annular face of longitudinal support 40A, 40B, and 40C respectively.

The three annular faces 40A, 40B, and 40C of the threaded rods of each sighting mechanism extend substantially in the same vertical and transverse plane.

Figure 6:
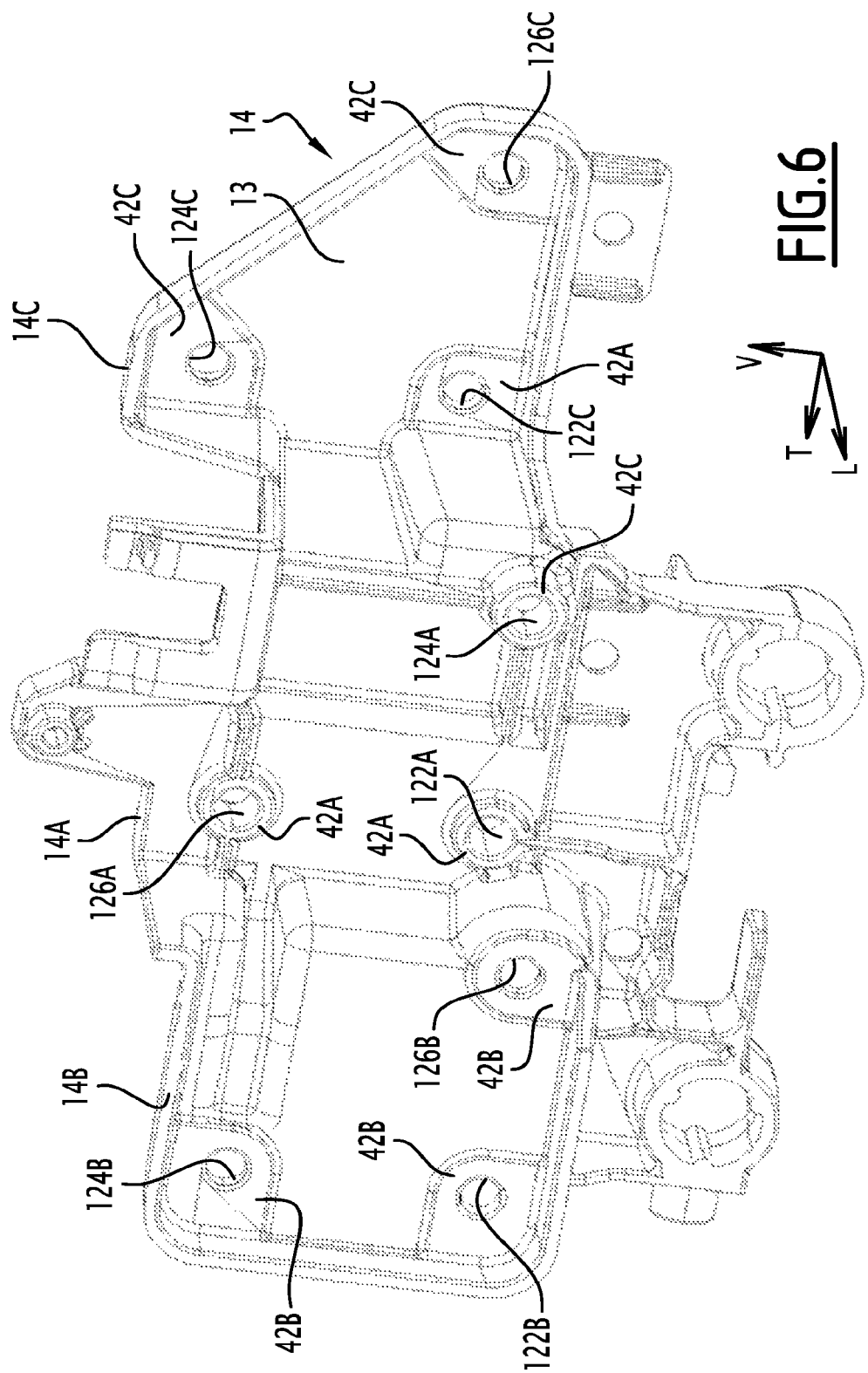
FIG. 6 is a front perspective view of the common frame.

As can be seen in FIG. 6, each of the holes 122A, 124A, and 126A formed in the central part 14A of the common frame 14 is surrounded by a planar annular bearing face 42A oriented toward the front.

All three of the annular bearing surfaces 42A extend substantially in the same vertical and transverse plane.

As for the lateral portions 14B and 14C, each hole is surrounded by a planar annular bearing surface oriented longitudinally toward the front 42B, 42C respectively.

The three bearing surfaces 42B, 42C associated with the same sighting mechanism are situated substantially in the same vertical and transverse plane.

For the mounting and the adjustment of the lateral modules 12B and 12C, each threaded rod of the associated sighting mechanism is equipped with a coil compression spring 44B, 44C which is traversed by the threaded segment and mounted, longitudinally compressed, between the fixation plate 18B, 18C and the associated portion 14B, 14C of the common frame 14.

Figure 9:
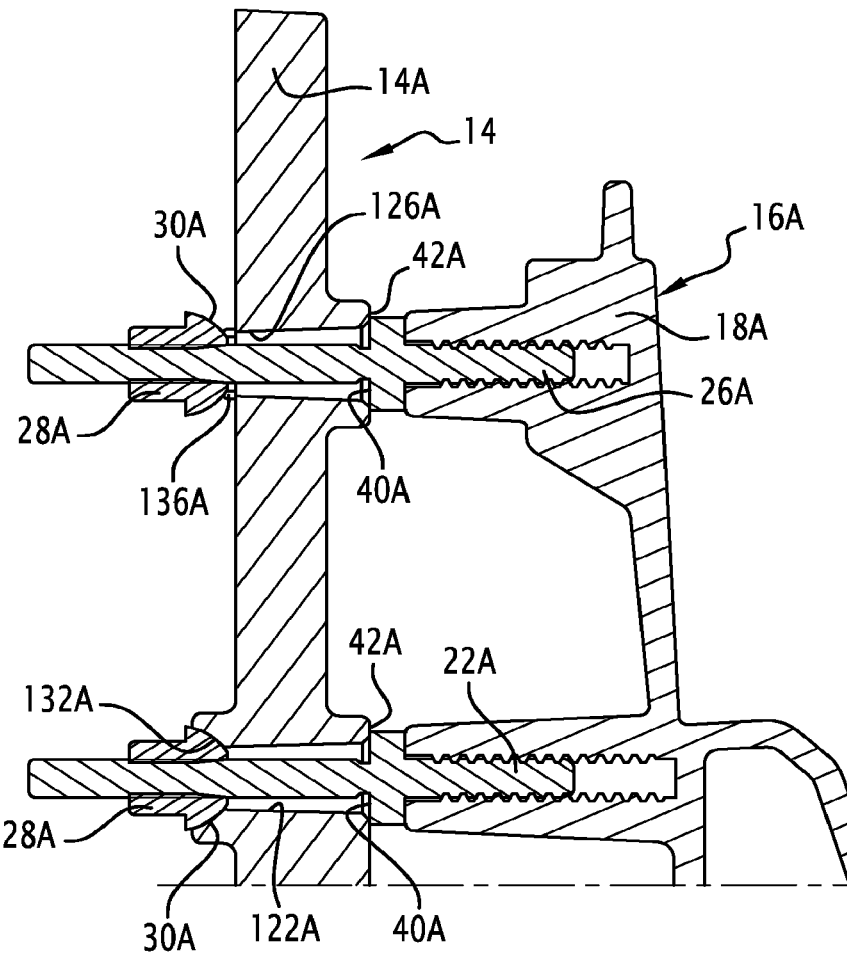
FIG. 9 is a sectional view along a vertical plane passing through line 9-9 of FIG. 3.
Figure 10:
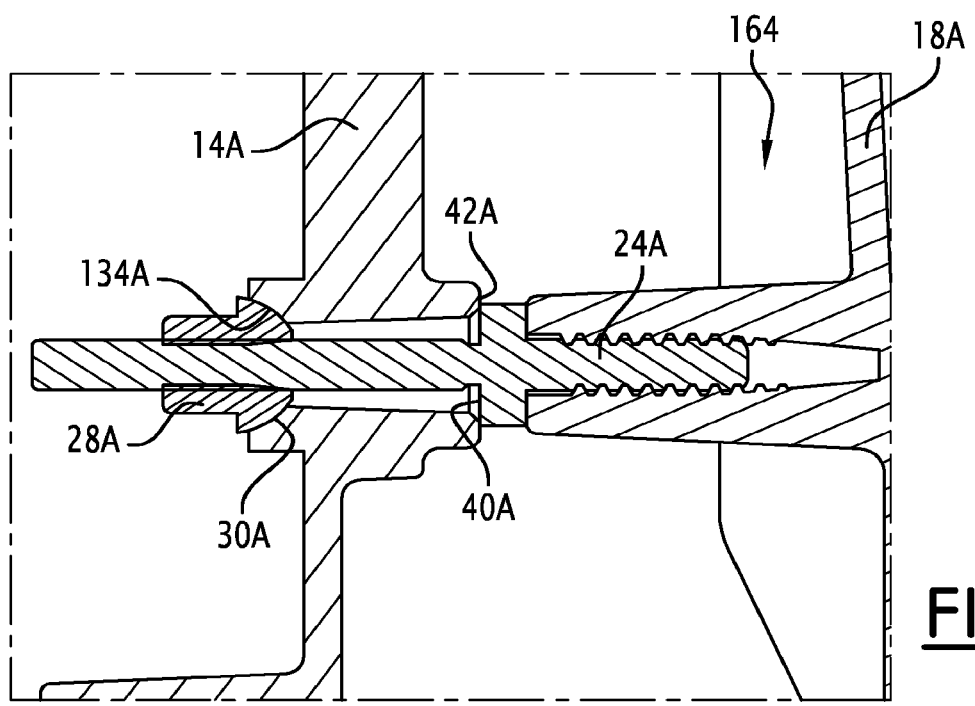
FIG. 10 is a sectional view along a vertical plane along line 10-10 of FIG. 3.

As can be seen in FIGS. 9 and 10, regarding the central optical module 12A, the threaded rods of the sighting mechanism are not equipped with a compression spring and in the mounted and fixed position each annular bearing shoulder 40A bears longitudinally against the associated facing annular bearing surface 42A.

Thus, the central module constitutes a "fixed" module whose longitudinal position and whose orientation of its axis of emission VA is fixed first in order to constitute a reference with respect to the common frame 14 for the adjusting of the other axes of emission VB and/or VC.

Only the optional interpositioning of washers or wedges between the bearing surfaces 40A and 42A could as a variant allow for adjusting the longitudinal position, along an axis generally parallel to the axis of emission VA, of the support 16A with respect to the frame 14-14A.

Each of the lateral modules, numbering two here, is a module whose "sighting" adjustment is then carried out with respect to the common frame 14 in order to adjust indirectly the longitudinal position and the orientation or inclination of its axis of emission VB, VC with respect to the axis of emission VA of the central module 12A.

The design making use of spherical nuts and the design of the associated complementary bearing surfaces, by virtue of the nature of the corresponding "contacts" (spherical 22, linear 24 and pointlike 26), make it possible to allow and/or block the movements of translation and/or rotation about the various axes L, V, T.

Figure 11:
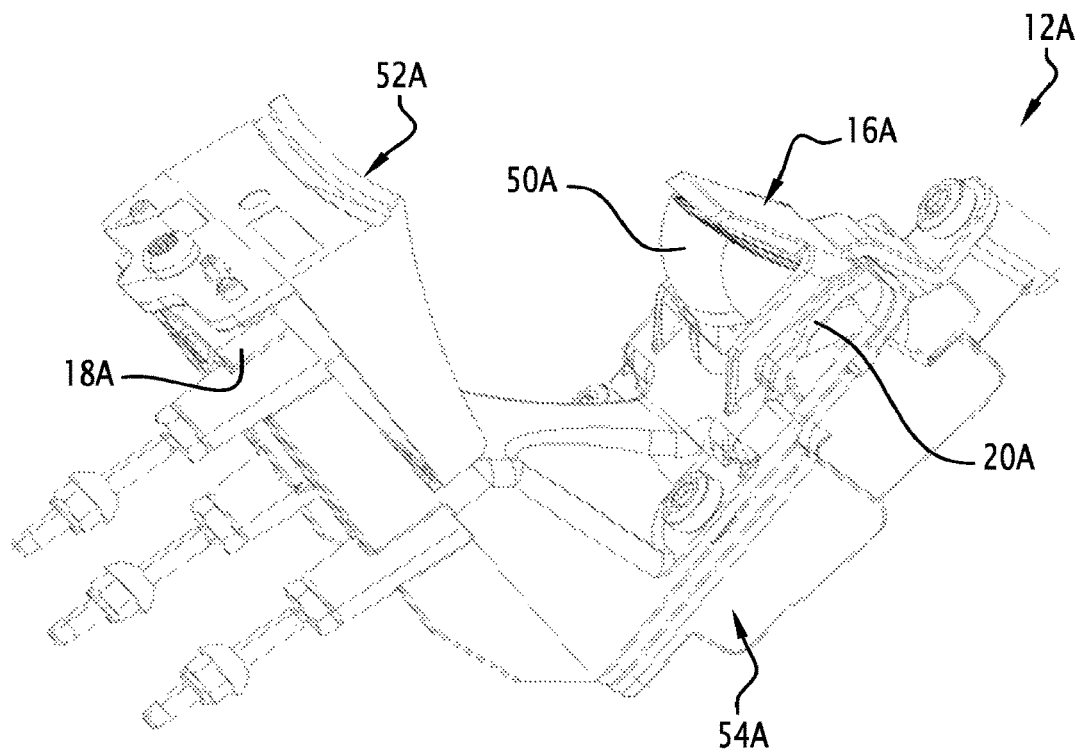
FIG. 11 is a perspective view illustrating one of the three optical modules belonging to the assembly illustrated in FIG. 1 with its principal components.

As a nonlimiting example, in particular as shown in FIG. 11, making reference here to the central optical module 12A, an optical module comprises for example a light source (not visible) carried by the board 20A and covered by a collector or lens 50A and a reflector 52A.

The reflector 52A is fixed on the fixation wing 18A of the support 16A.

The optical module 12A further comprises a cooling device 54A which is disposed here beneath the lower face of the board 20A. The cooling device 54A here is indirectly in contact with the support with the interpositioning of a printed circuit card.

Figure 12:
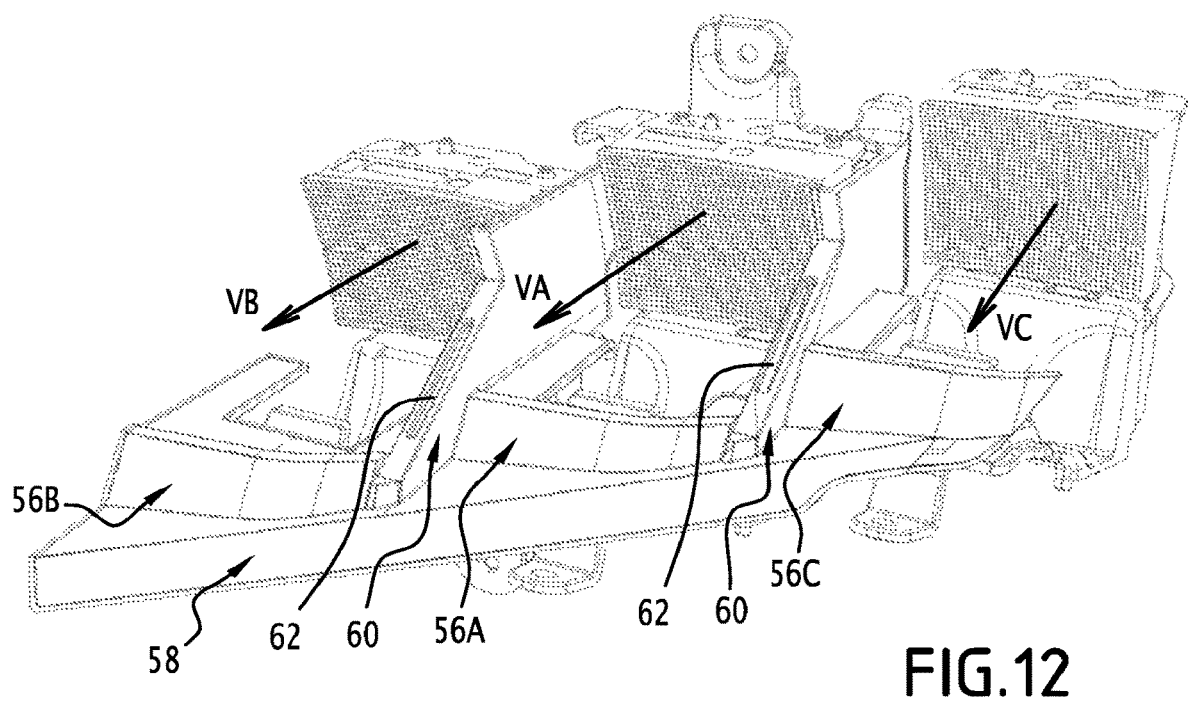
FIG. 12 is a perspective view along the same angle as that of FIG. 1 illustrating the bending element common to the three devices in association with the three supports and three reflectors.

The assembly 10 comprises a single piece 58 which is fixed to the support 16A of the central optical module 12A (see FIGS. 1 and 12). The piece 58 is a mask to improve the aesthetics of the assembly 10 and it has three main portions 56A, 56B, 56C each of which is associated with an optical module.

The mask 58 comprises two intermediate partitions 60 of vertical and longitudinal orientation, each of which extends between two adjacent modules and constitutes a shield which prevents rays of light emitted by a module from reaching components of the adjacent optical module.

In its free upper inclined edge, each partition 60 has a slot 62 for the mounting of a decorative dressing element 64 (see FIG. 1).

The invention is not limited to the exemplary embodiment just described.

The "spherical" design of the nuts constitutes a preferred embodiment, but without leaving the scope of the invention it is possible to make use of any equivalent design of the active clamping face, such as a truncated conical or annular design, making it possible to obtain, in cooperation with the complementary bearing surfaces, the same principles of spherical, linear and pointlike contact.

The invention as claimed includes the variants (not represented) making use of mechanical inversions, for example the inversion of the complementary convex and concave portions, or the inversion of the arrangement of the threaded rods on the common frame, and cooperating with holes formed in the supports.

Likewise, in regard to its components, the general design of an optical module has only been given as an example, and it may vary in a significant manner, as is illustrated for example in the documents FR-A-2.979.971 or FR-A-2.964.724.

As a nonlimiting example, the invention has been described with reference to a generally "horizontal" orientation of the axes of the modules, while this general orientation may be different in space.

The invention claimed is:

1. A lighting and/or signaling device for an automobile, the device comprising:
    an optical module for emission of a light beam in a forward direction along a horizontal axis of emission;
    a support on which the optical module is mounted;
    a frame on which the support is arranged, the frame extending in a transverse plane which is generally orthogonal to the axis of emission; and
    a sighting mechanism which adjusts an inclination angle of the axis of emission of the optical module, the support being mounted in adjustable manner on the frame via the sighting mechanism, wherein
    the sighting mechanism comprises:
    a reference threaded rod carried by the support and extending longitudinally backward through a first hole in the frame, the reference threaded rod carrying a spherical reference nut including a first active face cooperating with a complementary spherical reference bearing surface of a concave truncated spherical profile disposed on a rear face of the frame constituting spherical contact on the frame,
    an adjustment threaded rod carried by the support and extending longitudinally backward through a second hole in the frame, the adjustment threaded rod carrying a spherical adjustment nut including a second active face cooperating with a complementary cylindrical adjustment bearing surface of a concave truncated cylindrical profile disposed on the rear face of the frame constituting linear contact on the frame, and
    a pivoting threaded rod parallel to the reference and adjustment threaded rods which is carried by the support, which extends longitudinally backward through a third hole in the frame and which carries a spherical pivoting nut including a third active face of a truncated spherical profile cooperating with a complementary bearing surface of linear pivoting profile formed opposite the third active face in the rear face of the frame constituting point contact on the frame, the pivoting threaded rod providing along with the reference threaded rod pivoting guidance of the support in relation to the frame about a pivoting axis passing through a center of the first active face of the spherical reference nut and a center of the third active face of the spherical pivoting nut,
    the reference threaded rod is mounted so as to be rotatable with respect to the frame about a center of rotation corresponding to a center of the spherical reference bearing surface,
    the complementary bearing surface of linear profile comprises two rectilinear support ribs situated on either side of the spherical pivoting nut,
    the pivoting axis is orthogonal to a line passing through the center of the first active face of the spherical reference nut and a center of the second active face of the spherical adjustment nut,
    the first, second, and third holes in the frame through which the respective reference threaded rod, the adjustment threaded rod and the third pivoting threaded rod pass through make up vertices of a right triangle, the pivoting axis is orthogonal to an axis of the cylindrical adjustment bearing surface of the adjustment threaded rod, and the axis of the cylindrical adjustment bearing surface passes through the center of the first active face of the spherical reference nut.

2. The device according to claim 1, wherein the line passing through the center of the first active face of the spherical reference nut and the center of the second active face of the spherical adjustment nut extends in a horizontal plane for adjusting the inclination of the axis of emission of the optical module.

3. The device according to claim 1, wherein the line passing through the center of the first active face of the spherical reference nut and the center of the second active face of the spherical adjustment nut extends in a vertical plane for adjusting the inclination of the axis of emission of the optical module.

4. The device according to claim 1, wherein a segment of each of the reference threaded rod, the adjustment threaded rod, and the pivoting threaded rod respectively extending longitudinally through the first hole, the second hole, and the third hole in the frame is respectively received with radial play in the first hole, the second hole, and the third hole.

5. The device according to claim 1, wherein the support comprises a planar fixation wing extending in a plane generally orthogonal to the axis of emission and carrying the reference threaded rod, the adjustment threaded rod, and the pivoting threaded rod extending longitudinally backward from a rear face of the fixation wing.

6. The device according to claim 5, wherein the fixation wing comprises a front face carrying at least one component of the optical module.

7. The device according to claim 5, wherein the support comprises a board extending to the front from the fixation wing and carrying at least one component of the optical module.

8. The device according to claim 7, wherein the frame is a plate in which the holes are formed and which is bounded by the rear face and by a front face, and wherein the plate extends in a plane generally parallel to the fixation wing.

9. The device according to claim 1, wherein the support is made as a single piece by molding.

10. The device according to claim 1, wherein the frame is a plate in which the holes are formed and which is bounded by the rear face and by a front face.

11. The device according to claim 1, wherein the frame is made as a single piece by molding.

12. The device according to claim 1, wherein the optical module comprises one of:

an assembly of a collector disposed to collect the light emanating from a light source, a bending element having a cutting edge so as to let pass only a portion of the beam coming from the collector and to thus produce a corresponding light beam and its cutoff, and a reflector disposed to emit the corresponding light beam in the forward direction;

an assembly of a collector disposed to collect the light emanating from a light source, a bending element having at least one cutting edge so as to let pass only a portion of the beam coming from the collector and to emit the corresponding light beam and its cutoff, and a lens disposed to focus the light beam coining from the collector; or a reflector having a complex surface configured to collect the light emanating from a light source and to emit in the forward direction the corresponding light beam having a cutoff.

13. The device according to claim 1, wherein the optical module comprises a cooling device which directly or indirectly is in contact with the support.

14. The device according to claim 1, wherein the optical module comprises at least one light source in the form of at least one light-emitting diode.

15. A lighting and/or signaling assembly, for an automobile, comprising:

a first device according to claim 1 for emission of a first light beam in the forward direction along a horizontal axis of emission; and a second device according to claim 1 for emission of a second light beam in the forward direction along a horizontal axis of emission, a first support of the first device and a second support of the second device being arranged with respect to each other on a common frame extending in a transverse plane generally orthogonal to the axes of emission, the first support and the second support being mounted in adjustable manner on the common frame via a first sighting mechanism and a second sighting mechanism, respectively.

16. The assembly according to claim 15, wherein the first sighting mechanism locks in position the first support with respect to the common frame.

17. The assembly according to claim 16, wherein each threaded rod of the first sighting mechanism comprises a shoulder which bears longitudinally against an opposite portion of a front face of the common frame.

18. The assembly according to claim 15, wherein the second sighting mechanism adjusts the longitudinal position of the second support with respect to the common frame, along a direction parallel to the second axis of emission.

19. The assembly according to claim 18, wherein each threaded rod of the second sighting mechanism extends through a spring which is mounted compressed longitudinally between the second support and the common frame.

20. The assembly according to claim 15, wherein the assembly comprises a third device for emission of a third light beam in the forward direction along a horizontal axis of emission, a third support of the third device being disposed on the common frame, and being mounted in adjustable manner on the common frame via a third sighting mechanism whose design is identical to that of the second sighting mechanism.

21. The assembly according to claim 20, wherein the first device is disposed transversely between the second and third devices.

* * * * *